Patented Apr. 26, 1949

2,468,677

UNITED STATES PATENT OFFICE 2,468,677

METHOD OF PRODUCING EGG SUBSTITUTES

Torsten Wilhelm Lindewald, Norrkoping, and Simon Gruben, Kimstad, Sweden, assignors to Svenska Mjölkprodukter Aktiebolag, Stockholm, Sweden, a corporation of Sweden No Drawing. Application August 3, 1944, Serial No. 547,974. In Sweden July 22, 1943

6 Claims. (Cl. 99—114)

This invention relates to a method of producing a substitute for eggs from milk casein, the object being to obtain a product which by whipping in the presence of water may be converted into a foam of improved qualities particularly as regards its stability to heat and the volume of the foam produced. This invention also relates to an egg substitute produced according to this method.

It has already been proposed to produce a substitute for eggs which may be whipped to form a stable foam in the presence of water, by treating acid-precipitated casein, skim-milk, or wholly or partly evaporated skim-milk, with alkali or earth alkali hydroxides. This product gives good baking and cooking results in some cases. However, sometimes the alkaline reaction which must be imparted to the egg substitute in order to obtain a stable foam has a detrimental effect on the appearance, the consistency and the taste of the prepared foods. Due to the said alkaline reaction the valuable vitamins forming part of the milk component are also denatured, and the biological value of the milk albumen may be reduced by a racemisation or an undesirable decomposition of certain physiologically essential amino-acids. Such undesirable denaturing processes may also wholly or partly destroy for instance vitamins of other ingredients at the preparation of foods and baked products due to the alkaline reaction of the said egg substitute.

It has also been proposed to produce a substitute for eggs by removing the main part of the fat from milk products and then treating them with rennet. Such an egg substitute may be whipped to form a foam in the presence of water, but the product is not very stable to heat, this, of course, being a serious disadvantage at the preparation of certain foods and baked products. Moreover due to the jelly-like structure of a rennet-treated skim-milk product, for instance, there is some difficulty to convert such a product into a powder according to modern drying methods, such as by spray-drying or roller-drying.

The improved egg substitute according to the present invention is produced generally by adding to a milk casein containing product from which the main part of the milk fat has been removed rennet together with substances which are capable of converting dissociated or water-soluble calcium compounds into slightly dissociated or more or less insoluble calcium compounds.

It has turned out that if in accordance with the present invention rennet is added to skim-milk, or concentrated products of skim-milk, and if before, simultaneously with or after the addition of rennet water-soluble phosphates, for instance, such as alkali phosphates, are also added products are obtained which also in small amounts may be whipped to form a stable foam in the presence of water. Suspensions made according to the above-mentioned method are very liquid also at high concentrations and they may therefore be economically dried for instance according to the spray-drying method or the roller-drying method. Such a product made for instance from skim-milk using rennet and sodium pyrophosphate gives with water a product the foam of which is more stable than that of a product made with rennet alone or a product made only with pyrophosphate, and the volume of the foam is greater than that of the alkaline egg substitute mentioned in the preamble and the heat resistance greater than that of foam of egg albumen and foam of the above-mentioned alkaline egg substitute.

According to the invention it is possible to use as a starting material any milk casein containing product which is as free from fat as possible, such as acid-precipitated casein, rennet-casein, skim-milk, acid skim-milk or acid or sweet buttermilk from which products the water may have been wholly or in part removed.

Furthermore, it has turned out that products capable of being whipped to form stable foams may be produced with rennet-treated milk casein containing products and other substances than phosphates if the calcium compounds of the added substances are difficultly soluble or slightly dissociated. Thus for example sodium, potassium or ammonium salts of inorganic or organic acids are suitable substances if the calcium salts of the said acids are practically insoluble or undissociated. Of course, it is possible according to the invention to use also acids and bases, acid salts and bases or alkaline reacting salts etc., and this may sometimes be preferable from a practical point of view. Thus, the essential factor according to the invention is that the added substances of non-enzymatic nature are capable of converting the calcium compounds present in the milk product into a form which is as difficultly soluble or as slightly dissociated as possible.

From the point of view of quality and nutritive value it is suitable, in general, to adjust the reaction of the egg substitute to pH 6 to 7 in water solution. Below pH 6 the product is sometimes of inferior quality which according to own investigations seems to be due to the fact that the calcium compounds of the added substances are then more easily soluble. Good egg substitutes according to the invention having a reaction above pH 7 may also be produced, but the nutritive value of the products is then easily reduced by a denaturation for instance of vitamins present in the milk component.

The invention comprises the production of an egg substitute in solid form as well as in watery solution, or suspension. The casein containing products, the rennet as well as the other substances of non-enzymatic nature must not necessarily be added in a certain sequence. Special requirements as to the quality of the rennet are not necessary.

Example 1

1000 kg. of skim-milk are evaporated in a vacuum evaporator until a dry substance content of 38%. To this evaporated skim-milk there are added at about 20° C. while stirring 0.176 kg. of rennet of the quality "Christian Hansen (Copenhagen) 1800," suspended in 2 l. of water. When the mass has obtained the structure of a gel a mixture of 0.88 kg. of acid sodium pyrophosphate and 0.354 kg. of sodium hydroxide dissolved in 8 l. of water is added. Then the temperature is raised to 35° C. and the mass is allowed to stand at this temperature, while stirring, during 4 hours. It is then cooled to 15 to 20° C. and the reaction is adjusted to pH 6.5 by means of dilute sodium hydroxide solution. The product is converted into dry form, possibly after previous homogenisation, according to the spray-drying method or the roller-drying method.

Example 2

To a solution of 440 kg. of skim-milk powder in 900 kg. of water there is added while stirring a 10% solution containing 6.20 kg. of ortho-phosphoric acid (counted as 100% acid) neutralized by means of 10 kg. of potassium hydroxide. Care should be taken that the reaction remains between pH 6.3 and pH 6.7. 1.3 kg. of rennet "Hansen 1800" are stirred into 10 l. of water and are added to the above-mentioned mixture whereafter the same is allowed to stand, possibly with agitation, during about 4 hours at 35° C. It is then cooled below 15° C. and is dried in accordance with Example 1.

Example 3

154 kg. of dry or 514 kg., respectively, of wet acid-precipitated casein containing 30% of water are stirred into a solution containing 3 kg. of sodium bicarbonate and 1.5 kg. of calcium hydroxide in 1000 l. or 500 l., respectively, of water. When the casein has been practically dissolved 1.3 kg. of rennet powder "Hansen 1800" (stirred into 10 l. of water) are added, whereafter the treatment with rennet and the conversion into dry form is carried out as in Example 1.

Example 4

154 kg. of dry or 514 kg. of wet rennet-precipitated casein are added to 1000 l. or 500 l., respectively, of a watery solution containing 33 kg. of tartaric acid neutralized by means of 17.6 kg. of sodium hydroxide. After possible addition of a small amount of rennet (depending on the quality of the rennet-casein) the bulk is allowed to stand during 4 hours at 35° C. with agitation, whereupon the product is converted into powder form as in Example 1.

Example 5

A dry composition of 200 kg. of skim-milk powder, 0.6 kg. of rennet powder "Hansen 1800" and 5 kg. of sodium hexa-metaphosphate is made. Before use the powder is suspended in water and allowed to stand over night at room temperature.

Example 6

1000 l. of acid buttermilk are neutralized by means of a 10% solution containing 3 parts by weight of sodium carbonate, 4 parts by weight of sodium bicarbonate and 3 parts by weight of calcium hydroxide until a pH of 6.5, whereupon 0.176 kg. of rennet powder "Hansen 1800," suspended in 2 l. of water, are added and the product is treated with rennet and converted into dry form as in Example 1.

Example 7

To 1000 l. of skim-milk there are added, while stirring, 0.176 kg. of rennet powder "Hansen 1800," suspended in 2 l. of water. Then 1.5% of a Petit Gruyère cheese-making salt known on the market under the trade mark name "Joha" and comprising a mixture of phosphates are added while stirring and the mixture is allowed to stand over night at room temperature. The suspension may then be whipped to form a stable foam.

Example 8

To 1000 l. of skim-milk there are added while stirring 0.176 kg. of rennet powder "Hansen 1800" suspended in 2 l. of water. Then 0.75% of sodium pyrophosphate and 0.5% of salt of hartshorn, counted upon the weight of the dry substance of the milk, are added, while stirring, and the mixture is allowed to stand over night at room temperature. The suspension may then be whipped to form a stable foam.

The expression "skim-milk" as used above and in the appended claims is intended to cover as well skim-milk proper as also separated milk.

What we claim is:

1. A method of producing a substitute for eggs capable of being whipped to a stable foam in the presence of water, which comprises removing substantially all of the fat from milk, decomposing the casein of the fat-free milk so obtained by means of rennet at a pH of substantially 6 to 7 and in the presence of a substance capable of forming substantially undissociated calcium compounds with dissociated calcium compounds, and drying the decomposed product.

2. A method of producing a substitute for eggs capable of being whipped to a stable foam in the presence of water, which comprises decomposing skim milk by means of rennet at a pH of from 6 to 7 and in the presence of a substance capable of forming substantially undissociated calcium compounds with dissociated calcium compounds, and drying the decomposed product.

3. A method of producing a substitute for eggs capable of being whipped to a stable foam in the presence of water, which comprises decomposing butter milk by means of rennet at a pH of from 6 to 7 and in the presence of a substance capable of forming substantially undissociated calcium compounds with dissociated calcium compounds, and drying the decomposed product.

4. A method as claimed in claim 1, wherein the substance forming substantially undissociated calcium compounds with dissociated calcium compounds is a water-soluble phosphate.

5. A method as claimed in claim 1, wherein the substance forming substantially undissociated calcium compounds with dissociated calcium compounds is a water-soluble pyrophosphate.

6. A substitute for eggs capable of being whipped to a stable foam in the presence of water, comprising a dried, decomposed, substantially fat-free milk, the casein of which has been decomposed by means of rennet at a pH of from 6 to 7 and in the presence of a substance capable of forming substantially undissociated calcium compounds with dissociated calcium compounds.

TORSTEN WILHELM LINDEWALD.
SIMON GRUBEN.

REFERENCES CITED

The following references are of record in the file of this patent:

UNITED STATES PATENTS

| Number | Name | Date |
| --- | --- | --- |
| 268,245 | Lahrmann | Nov. 28, 1882 |
| 1,373,651 | Cullen | Apr. 5, 1921 |
| 1,592,777 | Monrad | July 13, 1926 |
| 2,135,054 | Schwartz | Nov. 1, 1938 |
| 2,341,425 | Curry | Feb. 8, 1944 |
| 2,343,713 | Spur | Mar. 7, 1944 |

OTHER REFERENCES

Schwartz et al., Jr. of Dairy Science, vol. 23, pages 19 to 35, pages 34 and 35 are relied upon.